United States Patent
Fague et al.

(10) Patent No.: US 11,979,638 B2
(45) Date of Patent: May 7, 2024

(54) METHOD FOR THE RECEPTION OF AUDIO CONTENTS IN A HYBRID RECEIVER AND TIME-SHIFTED PLAYBACK, RECEIVER AND PROGRAM ASSOCIATED WITH THE METHOD

(71) Applicant: TDF, Montrouge (FR)

(72) Inventors: Dimitri Fague, Paris (FR); Francois Lebrat, Paris (FR); David Vincent, Amanlis (FR)

(73) Assignee: TDF, Montrouge (FR)

( * ) Notice: Subject to any disclaimer, the term of this patent is extended or adjusted under 35 U.S.C. 154(b) by 6 days.

(21) Appl. No.: 16/627,109

(22) PCT Filed: Jun. 27, 2018

(86) PCT No.: PCT/EP2018/067225
§ 371 (c)(1),
(2) Date: Dec. 27, 2019

(87) PCT Pub. No.: WO2019/002354
PCT Pub. Date: Jan. 3, 2019

(65) Prior Publication Data
US 2020/0236439 A1    Jul. 23, 2020

(30) Foreign Application Priority Data
Jun. 28, 2017    (FR) ...................... 1755968

(51) Int. Cl.
*H04N 21/472* (2011.01)
*H04H 20/24* (2008.01)
(Continued)

(52) U.S. Cl.
CPC ...... *H04N 21/47217* (2013.01); *H04H 20/24* (2013.01); *H04H 60/85* (2013.01); *H04N 21/2387* (2013.01)

(58) Field of Classification Search
None
See application file for complete search history.

(56) References Cited

U.S. PATENT DOCUMENTS

| 7,522,167 | B1 | 4/2009 | Diard et al. |
| 10,897,652 | B1 * | 1/2021 | Atkins ............... H04N 21/2146 |

(Continued)

FOREIGN PATENT DOCUMENTS

| AU | 2014274511 A1 | 1/2015 |
| CN | 101563941 A | 10/2009 |

(Continued)

OTHER PUBLICATIONS

English translation of the Written Opinion of the International Searching Authority dated Sep. 25, 2018 for corresponding International Application No. PCT/EP2018/067232, filed Jun. 27, 2018.

(Continued)

*Primary Examiner* — Heather R Jones
(74) *Attorney, Agent, or Firm* — David D. Brush; Westman, Champlin & Koehler, P.A.

(57) ABSTRACT

A method of reception and playback of audio and/or audiovisual contents in a receiver device capable of receiving a determined audio and/or audiovisual stream coming from a one-way or two-way network. A determined stream broadcast on a network is received and the contents transmitted by the stream are played back in the receiver device. A first event external to the receiver device is detected. It triggers interruption of the playback of the content in progress and recording of the instant of the interruption. Then a second external event is detected. It triggers determining the availability of the unplayed part of the interrupted content and the display of a menu to a user that he should play back the (Continued)

Figure 1:
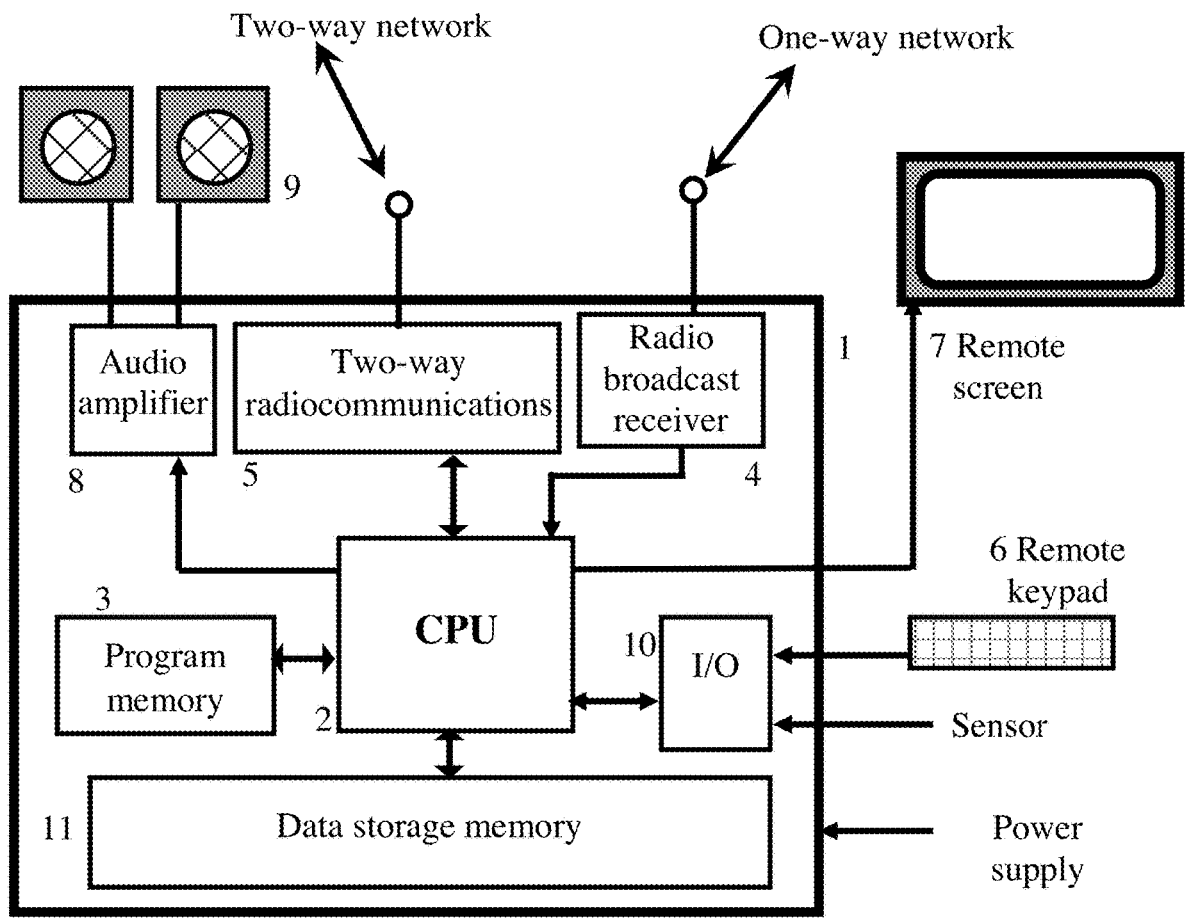

unplayed part. The introduction of a command then triggers retrieval of the unplayed part and the playback of the retrieved content part.

8 Claims, 4 Drawing Sheets

(51) Int. Cl.
*H04H 60/85* (2008.01)
*H04N 21/2387* (2011.01)

(56) References Cited

U.S. PATENT DOCUMENTS

| | | | |
|---|---|---|---|
| 2003/0158741 A1* | 8/2003 | Nakano | G11B 20/0084 704/503 |
| 2008/0162666 A1* | 7/2008 | Ebihara | H04L 67/06 709/217 |
| 2008/0248832 A1 | 10/2008 | Kim et al. | |
| 2009/0241149 A1* | 9/2009 | Yoshioka | H04N 21/41407 725/87 |
| 2010/0060801 A1 | 3/2010 | Kimura | |
| 2010/0112935 A1 | 5/2010 | Minter et al. | |
| 2010/0167809 A1 | 7/2010 | Perlman et al. | |
| 2011/0301728 A1* | 12/2011 | Hamilton | G11B 27/30 700/94 |
| 2014/0373077 A1* | 12/2014 | Rumreich | H04N 21/4882 725/78 |
| 2016/0182192 A1 | 6/2016 | Milbar et al. | |
| 2017/0019709 A1* | 1/2017 | Gaur | H04L 65/605 |
| 2017/0171586 A1 | 6/2017 | Sartori et al. | |
| 2018/0091567 A1* | 3/2018 | Bekiares | H04L 65/4069 |
| 2018/0376105 A1 | 12/2018 | Davies | |
| 2019/0020923 A1* | 1/2019 | Joye | H04N 21/47217 |

FOREIGN PATENT DOCUMENTS

| | | |
|---|---|---|
| CN | 104301794 A | 1/2015 |
| JP | 2003111004 A | 4/2003 |

OTHER PUBLICATIONS

English translation of the Written Opinion of the International Searching Authority dated Sep. 25, 2018 for corresponding International Application No. PCT/EP2018/067225, filed Jun. 27, 2018.
English machine translation of Notification according to Article 94(3) of the parallel European Application No. 18 732 379.5 dated Mar. 30, 2021.
Office Action from U.S. Appl. No. 16/627,112, dated Dec. 1, 2020.
International Search Report dated Sep. 13, 2018 for corresponding International Application No. PCT/EP2018/067225, filed Jun. 27, 2018.
Written Opinion of the International Searching Authority dated Sep. 13, 2018 for corresponding International Application No. PCT/EP2018/067225, filed Jun. 27, 2018.
International Search Report dated Aug. 16, 2018 for corresponding International Application No. PCT/EP2018/067232, filed Jun. 27, 2018.
Written Opinion of the International Searching Authority dated Aug. 16, 2018 for corresponding International Application No. PCT/EP2018/067232, filed Jun. 27, 2018.
Search Report for Chinese Patent Application No. 2018800441710 dated Jul. 26, 2021.
Notice of Allowance dated Sep. 15, 2021 for U.S. Appl. No. 16/627,112, filed Dec. 27, 2019.
Final Office Action from U.S. Appl. No. 16/627,112, dated Jun. 18, 2021.
Second Office Action for related Chinese Patent Application No. 201880043710.9 dated Oct. 29, 2021.

* cited by examiner

METHOD FOR THE RECEPTION OF AUDIO CONTENTS IN A HYBRID RECEIVER AND TIME-SHIFTED PLAYBACK, RECEIVER AND PROGRAM ASSOCIATED WITH THE METHOD

1. FIELD OF THE INVENTION

The field of the invention is that of the reception of an audio or audiovisual content in a hybrid receiver capable of receiving contents from a both broadcasting network and a two-way network. The invention relates more particularly to the fact that the playback of contents is interrupted in order to be resumed a little later at the user's request.

2. TECHNOLOGICAL BACKGROUND

In the field of the playback of audio or audiovisual contents, there are known receivers called "hybrid" receivers capable of receiving and playing back, equally well, broadcasts coming from a broadcasting network, contents transmitted from a site, and contents transmitted in "podcast" mode. These receivers are provided with a user interface comprising a screen and a keypad, radio reception means and means for sending sound signals to speakers. The user sets his device to receive a content that is broadcast by radio or comes from an Internet site. Certain hybrid devices can augment the reception of broadcast audio contents with an Internet or "IP" type connection, for example by improving the coverage zone for the broadcast contents by combining their conventional reception through FM or DAB broadcasting networks with downloading or streaming by IP (Wi-Fi, 3G, 4G) networks.

In the context of roaming devices such as for example car radios, the contents are transmitted by radio and the quality of the reception depends on proximity to the sending base. At certain places, the device exits a coverage zone and reception is no longer possible. The device interrupts the playback of the content and resumes the broadcast in real time once radio coverage is recovered. Throughout the time of interruption, the user loses his audio content, and this is quite unpleasant when the broadcast is interesting.

A simple way to retrieve a content that has been broadcast beforehand is to link up to a site that enables this content to be downloaded. The downloading will enable the user to record this content in the memory of the device and to play it back. The device is possibly provided with commands to fast forward and thus go beyond those instants that the user has already listened to. This operation, which enables the retrieval of parts of the broadcast contents that have not been played back, is fairly cumbersome because the user must himself identify the content that he wishes to download.

The document US 2003/158741, published on Aug. 21 2003, teaches that, to prevent the copying of IP rights, access to AV content is restricted for a certain period of time, for example during the hour that follows its broadcast. This content is automatically erased from the receiver as soon as the duration of authorization has elapsed.

The document US 2009241149, published on September 2009, teaches that a user who watches a content on a first screen may wish to shift position and watch this content on a second screen, at a different place. He then places the playback on his first screen on pause and restarts the playback of the content on the second screen, the content being played back on the second screen at the instant when it was interrupted on the first screen.

The document US 2014373077, published on Dec. 18 2014, also teaches the possibility for a user of suspending the playback of a content in one room and resuming it in another room, at the position where this playback had been interrupted.

There is a real need for a method to easily retrieve at least parts of the content that are broadcast in a radio stream and have not yet been played back in a receiver.

The invention further makes it possible to augment the interface of the users of devices for receiving a radio stream, improve the relationship of the listeners with their preferred radio stations and indirectly contribute to the market economy of the audiovisual sector.

The invention also proposes a technical method and an architecture that are applicable to the implementing of all cases of the use of "stop and restart" services and are usable by car-radio makers and by the publishers of contents broadcast on a radio stream in a form of access to a dedicated service platform operated in the world-wide web.

3. SUMMARY OF THE INVENTION

One particular embodiment of the invention proposes a method of reception and playback of audio and/or audiovisual contents in a receiver device capable of receiving a determined audio and/or audiovisual stream coming from a one-way or two-way network. The method comprises at least the following steps:
- a step of reception of the determined stream broadcast on a network and of playback of the contents transmitted by said stream in the receiver device,
- a step of detection of a first event external to the device triggering the interruption of the playback of the content in progress and the recording of the instant of the interruption,
- a subsequent step of detection of a second external event triggering a step for determining a piece of information indicating the availability of the unplayed part of the interrupted content and a step for displaying a menu proposing to play back said part,
- a step of reception of a first user command triggering the retrieval of the unplayed part of the content and the playback of the retrieved content part.

Thus, the proposed solution relies on a wholly novel and inventive approach, enabling the retrieval of a content broadcast on a radio stream, the playback of which has been interrupted, and making it possible to prompt a user to resume his playback a little later According to a preferred embodiment, the first and second events are the introduction of a second user command to stop the playback of the stream and to resume it. In this way, the user can himself stop the playback of the content and resume it at a time that suits him.

According to another embodiment, the second event occurs when the receiver is turned on again. In this way, the user can continue the playback of the interrupted content when his receiver is turned on again.

According to another embodiment, the first event is the stopping of the reception of the stream, the second event is the resumption of the reception of the stream. The detection of the second external event triggers a step of retrieval of the interrupted content on the two-way network during a second broadcast. In this way, if the device no longer receives the content at a certain time then, at resumption, the playback restarts at the place where it stopped.

According to another embodiment, the first event is the opening of a two-way communications using the sound or audiovisual rendering means of the receiver device, said communications call, for example a telephone communications, being conducted between said receiver device and another communications network, the second event being the end of this two-way communication. In this way, if the device is used for another purpose for a certain time then, at the end of this use, the playback starts again at the place where it had stopped.

According to another embodiment, the first event triggers a step of recording of the content transmitted by the stream in a local memory of the receiver device. In this way, and inasmuch as the interruption of the playback is brief, the receiver does not need to ask a network to resume playback.

According to another embodiment, the second event triggers a step of verification that the totality of the content is available and, in response to the introduction of the user command, a step for playing the content from the local memory followed by a step of retrieval, from the network, of the remaining part of the unplayed content. In this way, the receiver can rapidly playback the locally recorded content and, at the end, switch over to the network to receive the remaining part.

According to another embodiment, the method comprises a step of reception, in response to the first request, of a piece of data indicating that the unplayed part of the interrupted content is available within said network and indicating that the step of reception of the first user command triggers the transmission, to the network, of a request to receive said unplayed part and the reception of said part to be played back without delay by the receiver device. In this way, the receiver receives from a network and a remote server, the unplayed content, which can now be played back.

According to another embodiment, the received data comprises a URL address enabling the downloading of at least the unplayed part of the interrupted content or a site address to send out the interrupted content as a podcast. In this way, the downloading of the unplayed content is facilitated.

According to another embodiment, the method comprises a step of display of an indication on the duration that has elapsed since the last interruption, this duration representing the value of the time lag between the time of transmission in the stream of the content and the time of the display of this same retrieved content. In this way, the user is informed of the time of playback of the unplayed content.

Another embodiment of the invention proposes a receiver of audio and audiovisual contents transmitted by a determined audio and/or audiovisual stream coming from a one-way or two-way network, said receiver comprising:
  a means of reception of the determined stream broadcast on a network and a means of playback of the contents transmitted by said stream,
  a first means of detection of a first event external to the receiver triggering the interruption of this playback of the content in progress and the recording of the time of the interruption,
  a second means for detecting a second external event triggering the determining of a piece of information indicating the availability of the unplayed part of the interrupted content, and the display of a menu proposing the playback of said part,
  a means of reception of a first user command triggering the retrieval of the unplayed part of the content and the playback of the part of the content thus retrieved.

Another embodiment of the invention proposes a computer program product comprising program code instructions to implement the method described in the above paragraphs, by the receiver device, when said program is executed on a computer.

4. LIST OF FIGURES

Figure 2:
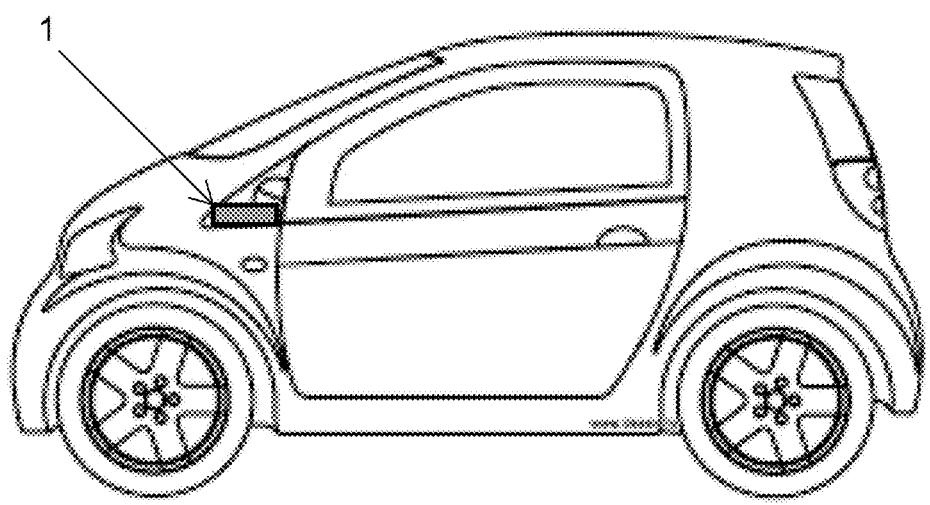
Figure 3:
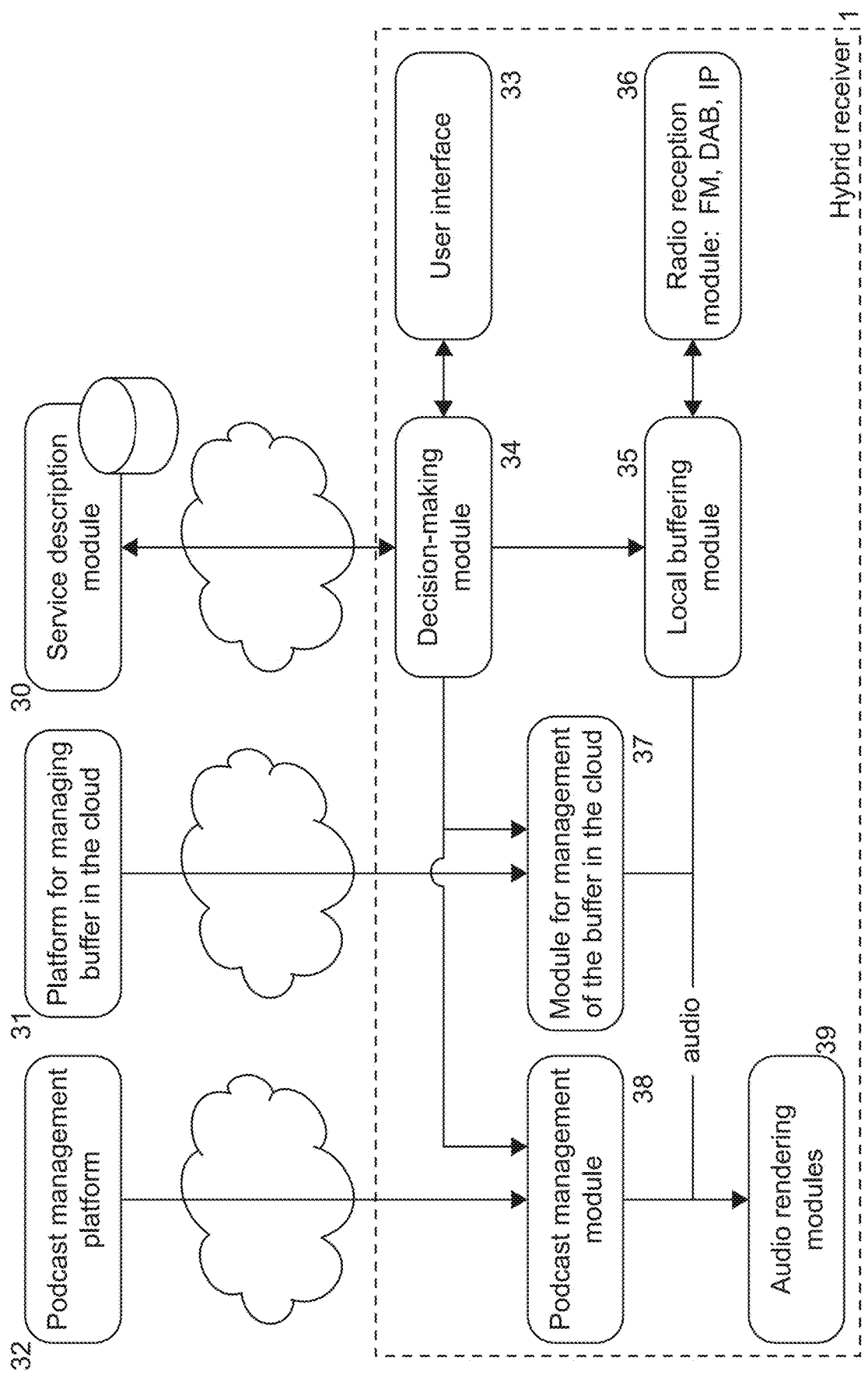
Figure 4:
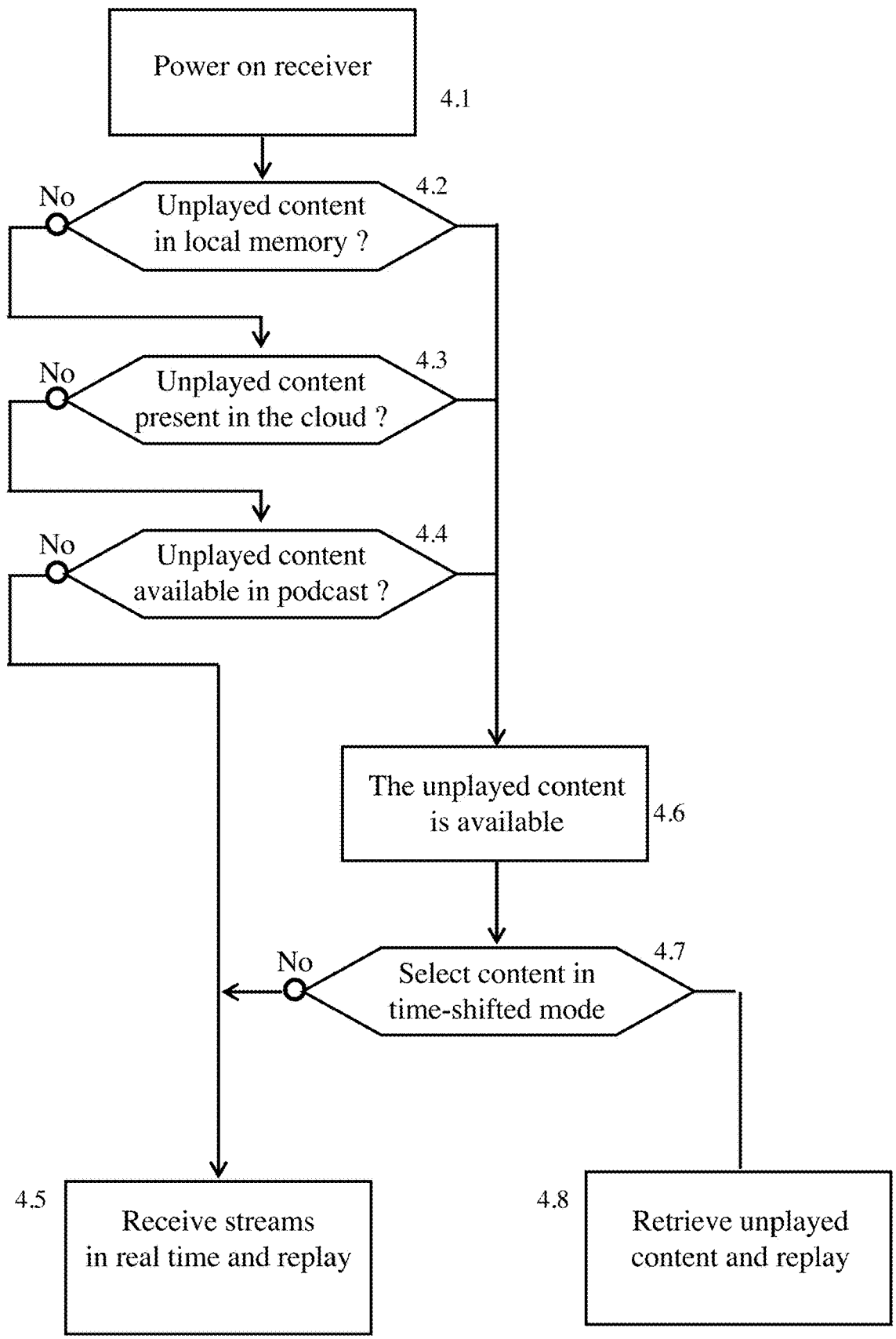
Figure 5:
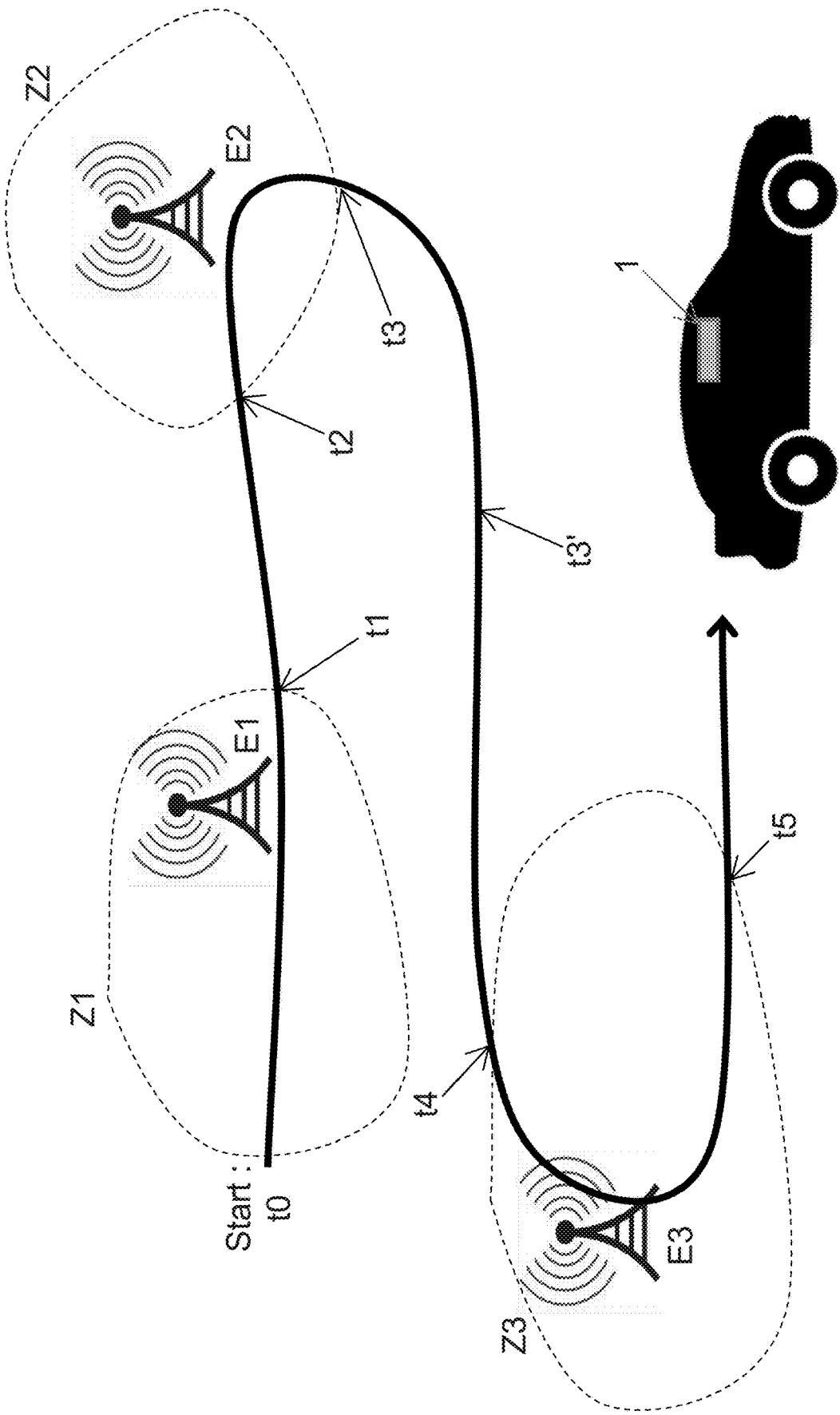

Other features and advantages of the invention shall appear from the following description, given by way of an indicatory and non-exhaustive example, and from the appended figures of which:

FIG. 1 presents the structure of a hybrid receiver according to one particular embodiment of the invention;

FIG. 2 illustrates the case where the hybrid receiver is a radio stream receiver embedded in a vehicle;

FIG. 3 presents an architecture of the software modules placed in the hybrid receiver and in the remote servers according to a preferred embodiment;

FIG. 4 presents a sequence chart illustrating a method of reception and playback of a content according to a preferred embodiment of the invention; and FIG. 5 illustrates the behavior of a hybrid receiver embedded in a vehicle passing through separated radio coverage zones.

5. DETAILED DESCRIPTION

5.1 General Principle

The invention relates to a method of reception and playback of audio and/or audiovisual contents in â receiver capable of receiving a determined audio and/or audiovisual stream coming from a one-way or two-way network. A determined stream broadcast on a network is first of all received and the contents transmitted by said stream are played back in the receiver. A first event external to the device is detected and triggers the interruption of the playback of the content in progress and the recording of the time of interruption. Then, a second external event is detected and triggers a step for determining the availability of the unplayed part of the interrupted content, and the display of a menu proposing the playback of said unplayed part to the user. The introduction of a command will then trigger the retrieval of the unplayed part of the content and the playback of the retrieved content part.

Thus, the proposed solution relies on a wholly novel and inventive approach making it possible to retrieve a content broadcast on a radio stream, the playback of which has been interrupted, and to prompt a user to resume his playback a little later.

5.2 Particular Embodiment

In all the figures of the present document, the identical elements (or steps) are designated by a same numerical reference.

Referring now to FIG. 1, we present a structure of a hybrid receiver device 1, according to one particular embodiment of the invention. The hybrid receiver 1 typically comprises a central processing unit 2 associated with a program memory 3, a radio stream reception module 4 receiving broadcasts from a one-way network, an FM network for example, and a communications module 5 permitting short-range or long-range two-way radio communications, using for example the Bluetooth, Wi-Fi and/or GSM network. The receiver also has means 6 for the introduction of commands (keypad, buttons, touchpad screen, etc.) and display means 7 (screen, light-emitting diodes, voice synthesis, etc.). These means can be integrated into the device or be remote devices. The device also has means for playing back an audio and/or audiovisual content, means formed for example by an amplifier 8 integrated into the device, and speakers 9 placed remotely. If the receiver device is a roaming device, embedded for example in a vehicle, the display can be integrated into the dashboard and the keypad can be placed in the immediate vicinity of the steering wheel. The device has input/output means 10 used to send out and receive signals to and from any device with which it is connected. It can receive signals coming from sensors, a microphone for example.

According to one non-obligatory improvement, the hybrid receiver also has a memory 11 capable of recording an audio content and/or audiovisual content broadcast by a one-way or two-way network.

The hybrid receiver receives an electrical power supply or has its own battery. It can be mobile and take the form of a smartphone.

Referring now to FIG. 2, we present the case where the hybrid receiver 1 is a receiver embedded in a vehicle. In this case, the receiver, more commonly called a car radio, is integrated into the electronic equipment of the vehicle. It can therefore receive broadcasts sent out on the FM band and, by means of its own communications means 5, make exchanges with a portable telephone by means of a short-range link and/or a two-way radio network, GSM for example. Such a receiver can also send out, in either analog or digital form, data representing sound signals towards speakers, these data coming from a broadcasting network or from a telephone communications network. The hybrid receiver 1 can also receive data representative of sound signals coming from a microphone and can transmit them to a portable phone by a short-range link. The central processing unit 2 commands the playback of the broadcast audio contents on the stream selected by a person present in the vehicle and automatically switches over the audio system to play back the sound signals of a telephone exchange when such a communications call is set up. According to one alternative embodiment, all the functions of a hybrid receiver device implementing the invention are integrated into the portable telephone.

FIG. 3 presents the architecture of the software modules placed in the hybrid receiver and in the remote servers according to a preferred embodiment of the invention. The top part of FIG. 3 has a service platform (PFSC or cloud service platform) formed by three software modules present in one or more remote servers communicating with the device 1 by means of a one-way or two-way network. These three modules are described in detail here below.

The service description module 30 receives requests from the hybrid receivers 1 via the radio network on the availability of access on the platform to time-shifted listening to a content previously broadcast on a radio stream at a determined date and time. In response to this request, this module indicates whether the content is available and if the answer is yes, the way to retrieve it, either through downloading by linking up to a certain address (or URL (Uniform Resource Locator)) and by indicating a piece of time information such as the date and the time of interruption of the content being broadcast, or by playing a recording accessible as a podcast in also specifying a piece of time-related information such as the date and time to get positioned at the precise instant of the piece of content that it is desired to receive. The service description module updates a table to provide the information on availability in response to a request from a hybrid receiver for receiving a certain content. In this way, in receiving the content identifier and the time of the interruption, the service description module responds by indicating whether this interrupted content is still available.

The content management module 31 in the network manages the different types of access proposed by the service description module to listen in time-shifted mode to a recording of a content in using downloading techniques, for example in DASH or HLS mode or in MP3 streaming.

The podcast management module 32 manages the different accesses proposed by the service description module to listen in time-shifted mode to an audio content broadcast by the radio stream in using recordings made available by the publishers in podcast mode or in playback mode.

The lower part of FIG. 3 which is surrounded by a dashed line designates all the software modules embedded in the memory 3 of the hybrid receiver 1. These modules are described in detail here below.

The user interface (UI) 33 enables communication between the device l and its user. This module especially makes command means available to the user to request a pause or a stop in listening to the received content, to record the identifier of the radio stream and the time of stoppage of its listening, and to prompt the user, through menus, to resume the playing of the content broadcast on the radio stream at the time when the playing is stopped.

The decision-making module 34 provides a status on the availability or non-availability of a time-shifted resumption of a playback of the content broadcast by the radio stream from the instant when the broadcast had been stopped. Should this resumption be possible, this module decides especially on the means to be used to enable time-shifted access to the playback of a recording of the content that has been broadcast on the radio stream at the time when the stop was triggered. This means can be especially a recording device integrated into the receiver 1 (i.e. the memory 11) or a recording means situated on a remote server accessible by downloading from URL addresses and from playing offsets provided by the service description module of the PFSC platform in response to interrogation requests from the decision-making module, or any other means.

The local recording module 35 is an optional element that comprises the memory 11 and the management program for managing this memory. The memory 11 is managed circularly with a write pointer and a read pointer, the arrival of a new piece of data overwriting the older piece of recorded data. The capacity of the memory 11 varies according to the performance of the device, and should be capable of recording a content of at least a few minutes. This module is activated upon the detection of an event interrupting the playback of the content received from the radio stream, the recording of the contents taking place so long as the storage capacity is not exceeded and so long as the receiver remains powered on. According to one improvement, the hybrid receiver fills the memory 11 with a broadcast content starting from the interruption and stops the filling when the memory is full. When an event triggering the resumption of playback occurs, the receiver verifies that the totality of the content can be retrieved before proposing that the user should resume the playback. If this is the case and if the user asks for the playing to be resumed, then the recorded data is first of all read in the memory and then the receiver searches for the missing data in the network and plays back this data.

the receiving module 36 manages the reception of the radio stream selected by the user. It makes it possible especially to receive the contents in real time.

the download-receiving module 37 makes it possible to download contents sent by the module 32. This module sends a request to a determined address (identified by a URL) in specifying a piece of time-related information corresponding to the date and time of stoppage of the playback. The module 30 indicates that the service is available and the amount of time for which it is available. For example, the module provides the duration during which the provider service can provide a content with a time shift after its broadcast.

The podcast reception module 38 enables the reception of a file transmitted as a podcast. This module sends out a request to a determined address (identified by a URL) in specifying a piece of time-related information corresponding to the date and time of stoppage of the playback, and the current date and time of the receiver. This latter piece of information makes it possible to synchronize the receiver with the platform PFSC. The address of the site delivering such a file is also provided by the service description module 30.

The audio or audiovisual rendering module 39 comprises the amplifier 8 and the speakers, and possibly a display device if the content has a component to be displayed, as well as a program managing the playback of the content, whether it is received in real time from the network or with a time shift or transmitted by the module 36.

Having described the constituent elements of the invention, we shall now explain the way in which they cooperate. To this end, FIG. 4 is a flowchart of the main steps illustrating the method of reception and of playback of a content according to a preferred embodiment. The steps thus described in detail are executed by the decision module 14 in retrieving the information provided by other modules.

At a first stage, the receiver has received a content transmitted by the radio stream and has played it back at a user's request. An event called a "prior" event has taken place and has interrupted the playback. This prior event is for example an intervention by the user to stop the playback, the taking of a telephone call which will use the audio system 8, 9 of the receiver, the detection of a power supply fault leading to the immediate stopping of the receiver, etc. At the time of the interruption, the receiver 1 records the identifier of the radio stream transmitting the content and the precise time of the interruption in a non-volatile memory. It records the content still being transmitted to the receiver 1 in the memory 1.

At a step 4.1, an event called a "subsequent" event takes place, triggering a change in the status of the receiver 1. In this new status the receiver can receive and play back contents broadcast on a radio stream. This subsequent event is for example an intervention by the user to resume the playback, the end of a telephone call that uses the audio system of the receiver or quite simply the powering on again of the receiver. At the step 4.2, the module 34 reads in the memory 11 to find out whether a unplayed content is present. In the event of an affirmative response, the program jumps to the step 4.6 to prompt the user to play it back. The module 34 also tests whether the content in memory 11 is complete, i.e. whether the audio data or audiovisual data that have been received during the interruption and the data that have been received have been truly recorded. If not, the module 34 extracts, from the non-volatile memory, the identifier of the radio stream, the playback of which has been recently interrupted, and transmits this identifier to the module 30. The module 30 responds to the receiver in indicating whether the requested content is available for downloading from a determined site. Thus, at the step 4.3, the module 34 determines whether the content transmitted immediately after the interruption is available by downloading from the module 31. In the event of an affirmative response, the program jumps to the step 4.6 to prompt the user to play back the unplayed content by retrieving it during a broadcast loop or by downloading it from the site indicated by the module 30. If not, at the step 4.5, the module 34 determines, according to the response transmitted by the module 30, whether the content indicated is available in podcast form. In the event of an affirmative response, the program also jumps to the step 4.6.

If the responses at the steps 4.2, 4.3 and 4.4 have been negative, it is not possible to retrieve said content and in this case only the content transmitted in real time, in this radio stream is available. It is then automatically played back involving the user (step 4.5). If not, the unplayed content is available (step 4.6). The module 34 then, at the step 3.7, sends a menu proposing that it should be selected, and awaits the user's response. If the user responds negatively, the content transmitted on this stream in real time is played back. If the user responds positively, the content is then retrieved as the case may be from the memory 11 of the receiver, the module 31 or the module 32 of the service platform PFSC, and immediately played back on the audio system of the receiver and possibly on the display unit.

According to one improvement, the menu mentioned at the step 3.7 comprises a step for displaying an indication on the time elapsed since the last interruption, this duration representing the value of the time lag between the time of transmission in the stream of the content and the time of display of this same retrieved content. In this way, the user can realize the time lag between the content being currently broadcast on this stream and the content that his receiver proposes that he should read.

FIG. 5 illustrates the behavior of a hybrid receiver embedded in a vehicle passing through separated radio coverage zones. In this case, the prior event interrupting the playback is caused by the fact of leaving a radio coverage zone and the subsequent event results from the reception again of the radio stream. The vehicle passes successively through the coverage zones Z1, Z2 and Z3 covered by the radio transmitters E1, E2 and F3. At the exit from the coverage zone Z1 which constitutes a prior event, the receiver 1 records the identifier of the radio stream and the precise time of the interruption. At the instant t2, the receiver detects a coverage zone, which constitutes a subsequent event. Since the unplayed content has obviously not been recorded, the receiver sends the platform PFSC a request to find out the availability of the content transmitted by the stream at the time of the interruption. Depending on the response from the platform PFSC, the receiver will prompt the user to download the unplayed content, or on the contrary will automatically switch to the content broadcast on the stream in real time.

Should the unplayed content (i.e. the content broadcast between t1 and t2) be available and should the user have requested its playback, this content is transmitted to the receiver, recorded in the memory 11 and played back with a time shift equal to the time lag between t1 and t2. In the meantime, the content transmitted in real time is received by the receiver and recorded in the memory 11 until the time t3 of exit from the zone Z2. The receiver will then continue to extract the recorded content from the memory until it is completely read. If, in the meantime, a coverage zone has been reached, the receiver 1 automatically asks the platform PFSC for the content starting from the instant t3, and downloads it into the memory 11. In this case (with the gap between t4 and t3 being smaller than the gap between t3 and t2), there is no interruption in the playback of the content, the user does not even realize that he has left the coverage zone for an instant, for example for the time elapsed when he is passing through a tunnel. If, on the contrary, a coverage zone is not yet reached at the time t3 at the end of the playback of the unplayed content of the memory, it means that the lag between t4 and t3 is greater than the lag between t3 and t2, and then a new prior event comes into play. The receiver then records the identifier of the radio stream and the instant t3 when it has come out of the coverage zone Z2. At the instant t4 of entry into a new coverage zone, it will then ask if the content transmitted on this radio stream from the time t4 is available.

It can thus be noted that by creating a time lag during the playback and by both receiving the radio stream in real time and downloading a content with a time shift, it is possible to eliminate interruptions in playback when passing through zones with no radio coverage.

It must be clear to those skilled in the art that the present invention enables embodiments in many other specific forms without departing from the field of application of the invention as claimed. The present embodiments should therefore be considered as illustrations but can be modified in the field defined by the scope of the appended claims.

The invention claimed is:

1. A method of reception and playback of audio and/or audiovisual content in a receiver device capable of receiving in real-time a determined audio and/or audiovisual stream coming from a one-way or two-way network, the method comprising at least:
   receiving the determined stream broadcast in real-time on a network and playing back in real-time the content transmitted by said stream in the receiver device;
   detecting a first event external to the receiver device, the first event being an opening of a two-way communication using a sound or audiovisual rendering element of the receiver device and being conducted between said receiver device and another communications network, triggering interruption of the playing back of the content in progress and recording the instant of the interruption of the playing back;
   subsequent to detecting the first external event, detecting a second external event, being an end of the two-way communication, triggering determining a piece of information indicating a presence of an unplayed part of the interrupted content in a local memory of the receiver device and determining a piece of information comprising a uniform resource locator and indicating whether said unplayed part of the interrupted content is still downloadable from a remote site;
   the presence in said local memory and/or the downloadability from the determined site of said unplayed part triggering
   automatically retrieving from the local memory and/or from the remote site the unplayed part of the content and automatically playing back the retrieved content from said instant of interruption; and
   both the absence in the memory and the non-downloadability of said unplayed part triggering automatically retrieving the content in real time from said stream and automatically playing back the retrieved content part.

2. The method of reception and playback of contents according to claim 1, wherein the two-way communication is a telephone communications call conducted between said receiver device and the other communications network.

3. The method of reception and playback of contents according to claim 1, wherein the second event triggers a verification that a totality of the content is either present in the local memory and/or downloadable from the remote site and, in response to receiving the first user command, playing the content from a local memory of the receiver device followed by retrieval, from the network, of the remaining part of the unplayed content.

4. The method of reception and playback of contents according to claim 1, further comprising receiving, in response to a first request, a piece of data indicating that the unplayed part of the interrupted content is downloadable within said network and indicating that the reception of the first user command triggers transmission, to the network, of a request to receive said unplayed part and the reception of said part to be played back without delay by the receiver device.

5. The method of reception and playback of contents according to claim 4, wherein the received data comprises a URL address enabling a downloading of at least the unplayed part of the interrupted content or a site address to send out the interrupted content as a podcast.

6. The method of reception and playback of contents according to claim 1, further comprising displaying an indication on a duration that has elapsed since a last interruption, this duration representing a value of a time lag between the instant of transmission in the stream of the content and the instant of the display of this same retrieved content.

7. A receiver device for receiving audio and audiovisual contents transmitted in real-time by a determined audio and/or audiovisual stream coming from a one-way or two-way network, said receiver comprising:
   a processor; and
   a non-transitory computer-readable medium comprising instructions stored thereon which when executed by the processor configure the receiver device to:
   receive the determined stream broadcast in real-time on a network and playback in real-time the contents transmitted by said stream;
   detect a first event external to the receiver, the first event being an opening of a two-way communication using a sound or audiovisual rendering element of the receiver device and being conducted between said receiver device and another communications network, triggering interruption of the playback of the content in progress and recording the instant of the interruption of the playback;
   subsequent to detecting the first external event, detect a second external event, being an end of the two-way communication, triggering determining a piece of information indicating a presence of an unplayed part of the interrupted content in a local memory of the receiver device and determining a piece of information comprising a uniform resource locator and indicating whether said unplayed part of the interrupted content is still downloadable from a remote site;

the presence in said local memory and/or the downloadability from the determined site of said unplayed part triggering automatically retrieving
from the local memory and/or from the remote site the unplayed part of the content and automatically playing back the part of the content thus retrieved from said instant of interruption; and
both the absence in the memory and the non-downloadability of said unplayed part triggering automatically retrieving the content in real time from said stream and automatically playing back the retrieved content part.

8. A non-transitory computer-readable medium comprising instructions stored thereon which when executed by a processor of a receiver device configure the receiver device to receive and playback audio and/or audiovisual content, wherein the receiver device is capable of receiving in real-time a determined audio and/or audiovisual stream coming from a one-way or two-way network, and wherein the instructions configure the receiver device to:

receive the determined stream broadcast in real-time on a network and play back in real-time the content transmitted by said stream in the receiver device;

detect a first event external to the receiver device, the first event being an opening of a two-way communication using a sound or audiovisual rendering element of the receiver device and being conducted between said receiver device and another communications network, triggering interruption of the playing back of the content in progress and recording the instant of the interruption of the playing back;

subsequent to detecting the first external event, detect a second external event, being an end of the two-way communication, triggering determining a piece of information indicating a presence of an unplayed part of the interrupted content in a local memory of the receiver device and determining a piece of information comprising a uniform resource locator and indicating whether said unplayed part of the interrupted content is still downloadable from a remote site;

the presence in said local memory and/or the downloadability from the determined site of said unplayed part triggering automatically retrieving from the local memory and/or from the remote site the unplayed part of the content and automatically playing back the retrieved content part from said instant of interruption; and both the absence in the memory and the non-downloadability of said unplayed part triggering automatically retrieving the content in real time from said stream and automatically playing back the retrieved content part.

* * * * *